United States Patent [19]

Nakatani et al.

[11] Patent Number: 4,997,462
[45] Date of Patent: Mar. 5, 1991

[54] PERVAPORATION METHOD OF SELECTIVELY SEPARATING WATER FROM AN ORGANIC MATERIAL AQUEOUS SOLUTION THROUGH AROMATIC IMIDE POLYMER ASYMMETRIC MEMBRANE

[75] Inventors: Masayuki Nakatani; Yoshiyuki Sumiyama; Yoshihiro Kusuki, all of Ichihara, Japan

[73] Assignee: Ube Industries, Ltd., Yamaguchi, Japan

[21] Appl. No.: 505,443

[22] Filed: Apr. 5, 1990

[30] Foreign Application Priority Data

Apr. 7, 1989 [JP] Japan ................................ 1-87079
Apr. 7, 1989 [JP] Japan ................................ 1-87080

[51] Int. Cl.⁵ ................................ B01D 6/36
[52] U.S. Cl. ................................ 55/16; 55/158; 210/640; 210/500.39
[58] Field of Search ............... 55/16, 158; 210/500.39, 210/640; 528/353, 229

[56] References Cited

U.S. PATENT DOCUMENTS 4,512,893   4/1985   Makino et al. ................... 55/158
4,528,004   7/1985   Makino et al. ................... 55/158
4,830,640   5/1989   Nakamura et al. ................ 55/158

*Primary Examiner*—Frank Sever

*Attorney, Agent, or Firm*—Finnegan, Henderson, Farabow, Garrett & Dunner

[57] ABSTRACT

A pervaporation separation method of water from an organic material aqueous solution at a high separating efficiency is effected by using a specific asymmetric separating membrane comprising a heat-resistant, solvent-soluble aromatic imide polymer prepared by the polymerization and imidization of an aromatic tetracarboxylic acid component comprising, as a principal ingredient, at least one biphenyl tetracarboxylic acid compound with an aromatic diamine component comprising a principal member selected from:

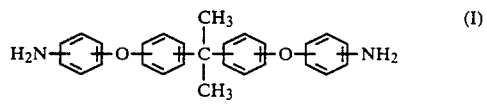

and

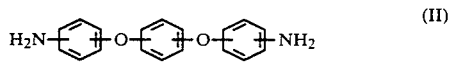

and an additional member selected from another aromatic diamine compounds having 2 to 5 benzene ring structures and different from the diamine compounds (I) and (II).

19 Claims, No Drawings

PERVAPORATION METHOD OF SELECTIVELY SEPARATING WATER FROM AN ORGANIC MATERIAL AQUEOUS SOLUTION THROUGH AROMATIC IMIDE POLYMER ASYMMETRIC MEMBRANE

BACKGROUND OF THE INVENTION

1. Field of the Invention

The present invention relates to a pervaporation method of selectively separating water from an organic material aqueous solution through an aromatic imide polymer asymmetric membrane.

More particularly, the present invention relates to a pervaporation method of selectively separating water from an organic material aqueous solution through an aromatic imide polymer asymmetric membrane at a high selectivity and at a high permeation rate, to concentrate or collect the organic material.

2. Description of the Related Art

It is known that water can be separated from an aqueous solution of an organic material by a distillation method. In the distillation method, however, some of the organic materials form an azeotropic mixture, or have boiling points close to water, or are chemically modified at the distillation temperature, and therefore, it is very difficult to selectively separate water from the organic materials.

To avoid the above difficulty, a method of separating water from an organic material by using a separating membrane has been attempted. In this method wherein a membrane is used to separate or concentrate an organic material aqueous solution, an aqueous solution of organic material is brought into contact with a face of a membrane, to allow a specific liquid to selectively permeate through the membrane due to a differential osmotic pressure. This method is referred to as a reverse osmosis method.

Usually, in the reverse osmosis method for an organic material aqueous solution, a higher pressure than the osmotic pressure of the aqueous solution must be applied to the aqueous solution, and therefore, the reverse osmosis method can not be applied to a concentrated organic material aqueous solution which exhibits a high osmotic pressure, and accordingly, the reverse osmosis method can be applied only to organic material aqueous solutions having a limited concentration of the organic material.

Recently, as a new type of separating method in which a separating membrane is used, a pervaporation method has been developed for an organic material solution and is now under serious consideration in this field.

In the pervaporation method, an organic material aqueous solution in the state of a liquid is brought into direct contact with a feed side face of a separating membrane capable of selectively allowing a specific component, for example, water, to permeate therethrough, and the opposite delivery side face of the membrane is exposed to a vacuum or a reduced pressure. The specific component, for example, water, is allowed to selectively permeate through the membrane and is collected in the state of a vapor at the opposite delivery side of the membrane. This method is useful for selectively separating or concentrating an individual organic material from an aqueous solution thereof compound mixture.

Also, it is known that aromatic imide polymers exhibit a higher heat resistance and chemical resistance than those of conventional polyamides, cellulose and cellulose acetate, and thus the utilization of the aromatic imide polymer as a material for forming a separating membrane is now under serious consideration. Accordingly, attempts have been made to utilize an asymmetric membrane consisting of a conventional aromatic imide polymer for separating water in the vapor state from an aqueous solution of an organic material.

Nevertheless, when used for the pervaporation method of separating water from an organic material aqueous solution, the conventional aromatic imide polymer separating membranes are disadvantageous in that:

(1) when the contact of the aromatic imide polymer membrane with the organic material aqueous solution or water is kept at a high temperature for a long time, the separating performance and mechanical strength of the membrane are significantly decreased, because the aromatic imide polymer in the membrane is decomposed by a hydrolysis thereof;

(2) due to the above-mentioned decomposition of the polymer, the aromatic imide polymer membrane exhibits a decreased durability, and thus does not always provide a satisfactory separation of water from the organic material aqueous solution; and (3) the selective separation of water from the organic material aqueous solution and the permeating rate of water through the conventional aromatic imide polymer membrane are not satisfactory in the pervaporation separating method.

Accordingly, there is a strong demand for a new type of aromatic imide polymer asymmetric membrane useful for the pervaporation method of selectively separating water from an organic material aqueous solution.

SUMMARY OF THE INVENTION

An object of the present invention is to provide a pervaporation method of selectively separating water from an organic material aqueous solution, at a high selectivity and with a high efficiency.

Another object of the present invention is to provide a pervaporation method of selectively separating water from an organic aqueous solution, through a specific aromatic imide polymer asymmetric membrane having a high durability and thus able to be continuously employed for a long time in industrial use.

The above-mentioned objects can be attained by the pervaporation method of the present invention of selectively separating water from an organic aqueous solution, which comprises the steps of:

bringing an aqueous solution of an organic material into contact with one face of an asymmetric membrane comprising at least one type of heat-resistant, solvent-soluble aromatic imide polymer which consists essentially of a polymerization and imidization product of:

(A) an aromatic tetracarboxylic acid component comprising:
 (a) 60 to 100 molar % of at least one principal member selected from the group consisting of biphenyl tetracarboxylic acids and dianhydride, esters and salts of the above-mentioned acids, and
 (b) 0 to 40 molar % of at least one additional member selected from the group consisting of aromatic tetracarboxylic acids and dianhydrides, esters and salts of the acids which are different from the above-mentioned compounds for the principal member (a); with (B) an aromatic diamine component comprising:

(c) 60 to 100 molar % of at least one principal member selected from the aromatic diamine compounds of the formulae (I) and (II):

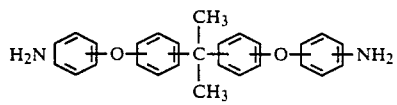

and

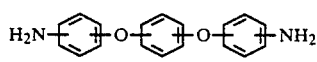

and (d) 0 to 40 molar % of at least one additional member selected from another aromatic diamine compounds having 2 to 5 benzene ring structures and different from the compounds of the formulae (I) and (II);

exposing the opposite face of the aromatic imide polymer asymmetric membrane to an atmosphere under a reduced pressure, to cause water in the aqueous solution to selectively permeate through the asymmetric membrane and the permeated water to be vaporized in the reduced pressure atmosphere; and collecting the permeated and vaporized water.

DESCRIPTION OF THE PREFERRED EMBODIMENTS

The pervaporation method of the present invention of selectively separating water from an organic material aqueous solution is carried out by using a specific aromatic imide polymer asymmetric separating membrane.

The specific separating asymmetric membrane of the present invention consists essentially of at least one type of heat-resistant, solvent soluble aromatic imide polymer which consists essentially of a polymerization product of (A) an aromatic tetracarboxylic acid component with (B) an aromatic diamine component.

The aromatic tetracarboxylic acid component (A) comprises:

(a) 60 to 100 molar %, preferably 80 to 100 molar %, more preferably 90 to 100 molar %, of at least one principal member selected from the group consisting of biphenyl tetracarboxylic acids, and dianhydrides, esters, preferably lower alkyl esters having 1 to 3 carbon atoms, and salts of the above-mentioned acids, and (b) 0 to 40 molar %, preferably 0 to 20 molar %, more preferably 0 to 10 molar %, of at least one additional member selected from the group consisting of aromatic tetracarboxylic acids, and dianhydrides, esters, preferably lower alkyl esters having 1 to 3 carbon atoms, and salts of those acids, which are different from the above-mentioned compounds for the principal members.

The aromatic tetracarboxylic acid compound for the principal acid member (a) is preferably selected from the group consisting of 2,3,3',4'-biphenyltetracarboxylic acid, 3,3',4,4'-biphenyltetracarboxylic acid, and dianhydrides, lower alkyl esters, preferably having 1 to 3 atoms and salts of the above-mentioned acids, more preferably 3,3',4,4'-biphenyltetracarboxylic dianhydride.

The aromatic tetracarboxylic acid compound for the additional member (b) is preferably selected from the group consisting of pyromellitic acid, 3,3',4,4'-diphenylether tetracarboxylic acid, 2,2-bis(3,4-dicarboxyphenyl)propane, bis(3,4-dicarboxyphenyl) methane, 3,3',4,4'-benzophenone tetracarboxylic acid, and dianhydrides, lower alkyl esters, preferably having 1 to 3 carbon atoms, and salts of the above-mentioned acids.

In the aromatic tetracarboxylic acid component (A), when the content of the principal aromatic tetracarboxylic acid component (a) is less than 60 molar %, or the content of the additional aromatic tetracarboxylic acid compound (b) is more than 40 molar %, the resultant aromatic imide polymer exhibits a poor solubility in phenolic solvents, and thus it becomes difficult to produce an asymmetric separating membrane having a uniform quality or a satisfactory pervaporation-separation property for organic compound mixtures.

The aromatic diamine component (B) usable for producing the separating asymmetric membrane comprises (C) 60 to 100 molar %, preferably 80 to 100 molar %, more preferably 90 to 100 molar %, of at least one principal member selected from those of the formulae (I) and (II):

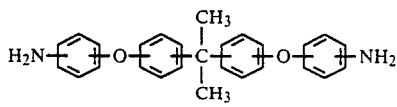

and

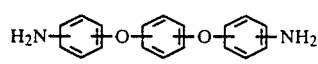

and (d) 0 to 40 molar %, preferably 0 to 20 molar %, more preferably 0 to 10 molar %, of at least one additional member selected from another aromatic diamine compounds having 2 to 5, preferably 2 to 4, benzene ring structure and different from the compounds of the formulae (I) and (II). The principal aromatic diamine compound (c) of the formula (I) in the aromatic diamine component (B) is preferably selected from the group consisting of 2,2-bis[4-(4-aminophenoxy)phenyl] propane, 2,2-bis[4-(3-aminophenoxy)phenyl] propane, 2,2-bis[3-(4-aminophenoxy)phenyl] propane, and 2,2-bis[3-(3-aminophenoxy)phenyl] propane.

The principal aromatic diamine compound (c) of the formula (II) in the aromatic diamine component (B) is preferably selected from the group consisting of 1,4-bis-(aminophenoxy)benzenes, for example, 1,4-bis(4-aminophenoxy)benzene and 1,4-bis(3-aminophenoxy)benzene, and 1,3-bis(aminophenoxy)benzenes, for example, 1,3-bis(4-aminophenoxy)benzene and 1,3-bis(3-aminophenoxy)benzene.

The additional aromatic diamine compound (d) in the aromatic diamine component (B) is preferably selected from the group consisting of the following compounds.

(1) Aromatic diamine compounds having two benzene ring structures
  (i) Diaminodiphenylethers, for example, 4,4'-diaminodiphenylether, 3,4'-diaminodiphenylether, and 3,3'-diaminodiphenylether
  (ii) Diaminodiphenylmethanes, for example, 4,4'-diaminodiphenylmethane, 3,4'-diaminodiphenylmethane, and 3,3'-diaminodiphenylmethane
(iii) Diaminodiphenylpropanes, for example, 2,2-bis(4-aminophenyl)propane, 2,2'-(3,4'-diaminodiphenyl)propane and 2,2-bis(3-aminophenyl)propane
(iv) Diaminobiphenyls, for example, o-dianisidine, o-tolidine and m-tolidine
(v) Diaminodiphenylthioethers, for example, 4,4'-diaminodiphenylthioether, 3,4-diaminodiphenylthioether, and 3,3'-diaminodiphenylthioether
(vi) Diaminodiphenylsulfones, for example, 4,4'-diaminodiphenylsulfone, 3,4'-diaminodiphenylsulfone and 3,3'-diaminodiphenylsulfone
(vii) Diaminodiphenylenesulfone, for example, 2,8-dimethyl-3,7-diaminodibenzothiophene-5,5-dioxide, 2,6-dimethyl-3,7-diaminodibenzothiophene-5,5-dioxide, and 4,6-dimethyl-3,7-diaminodibenzothiophene-5,5-dioxide
(viii) Diaminodibenzothiophenes, for example, 3,7-diaminodibenzothiophene, 3,7-diaminodibenzothiophene-5,5-dioxide, 2,8-dimethyl-3,7-diaminodibenzothiophene, 2,6-dimethyl-3,7-diaminodibenzothiophene, and 4,6-dimethyl-3,7-diaminodibenzothiophene,
(ix) Diaminothioxanthenes, for example, 3,7-diaminothioxanthene, 3,7-diaminothioxanthene-5,5-dioxide, 2,8-dimethyl-3,7-diaminothioxanthene, 2,6-dimethyl-3,7-diaminothioxanthene, 4,6-dimethyl-3,7-diaminothioxanthene, 2,8-dimethyl-3,7-diaminothioxanthene-5,5-dioxide, 2,6-dimethyl-3,7-diaminothioxanthene-5,5-dioxide, and 4,6-dimethyl-3,7-diaminothioxanthene-5,5-dioxide.
(2) Aromatic diamine compounds having three benzene ring structures
 (i) Bis(aminophenyl)benzenes, for example 1,4-bis(3-aminophenyl)benzene, 1,4-bis(4-aminophenyl)benzene, 1,3-bis(3-aminophenyl)benzene, and 1,3-bis(4-aminophenyl)benzene
(3) Aromatic diamine compounds having four benzene ring structure
 (i) Bis[(aminophenoxy)phenyl]ethers, for example, bis[4-(4-aminophenoxy)phenyl]ether, bis[4-(3-aminophenoxy)phenyl] ether, bis[3-(4-aminophenoxy)phenyl]ether, and bis[3-(3-aminophenoxy)phenyl]ether
 (ii) Bis(aminophenoxy)biphenyls, for example, 4,4'-bis(4-aminophenoxy)biphenyl, and 4,4'-bis(3-aminophenoxy)biphenyl
 (iii) Di[(aminophenoxy)phenyl]methanes, for example, 4,4'-di(4-aminophenoxy)diphenylmethane, and 4,4'-di(3-aminophenoxy)diphenylmethane,
(4) Aromatic diamine compound having five benzene ring structures for example, 9,10-bis(4-aminophenyl)anthracene.

The aromatic diamine component (B) may contain molar % or less of at least one aromatic diamine compound having a single benzene ring structure selected from, for example, phenylene diamines and diaminobenzoic acids.

In an embodiment of the method of the present invention, the heat-resistant, solvent soluble aromatic imide polymer in the asymmetric membrane comprises:
(1) 60 to 100 molar % of at least one type of major recurring units selected from those of the formulae (III) and (IV):

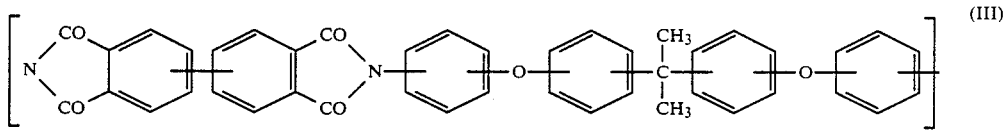

and

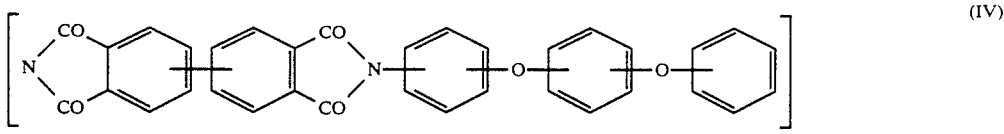

and
(2) 0 to 40 molar % of at least one type of minor recurring units selected from those derived from the polymerization and imidization of:
 (i) an aromatic tetracarboxylic acid component consisting essentially of at least one member selected from the group consisting of biphenyl tetracarboxylic acids and dianhydrides, esters and salts thereof, with
 (ii) an aromatic diamine component consisting essentially of at least one member selected from aromatic diamine compounds having 2 to 5 benzene ring structure and different from those of the formulae (I) and (II):

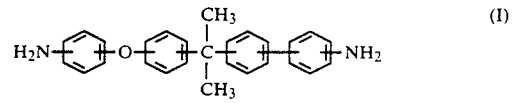

and

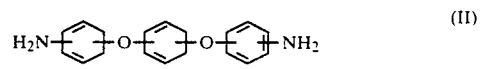

In another embodiment of the method of the present invention, the heat-resistant, solvent-soluble aromatic imide polymer comprises 60 to 100 molar % of at least one type of principal recurring units of the formula (III):

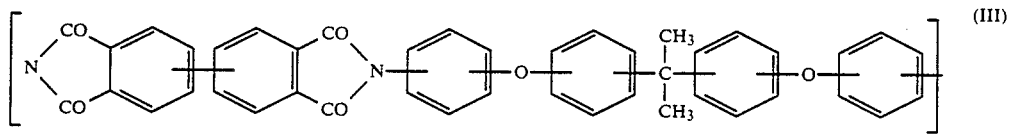

(III)

and 0 to 40 molar % of at least one type of additional recurring units derived from the polymerization and imidization of at least one member selected from biphenyl tetracarboxylic acids, and dianhydrides, esters and salts of the above-mentioned acids, with at least one member selected from aromatic diamine compounds having 2 to 5 benzene ring structure and different from those of the formula (I):

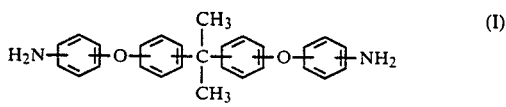

(I)

zene ring structure and different from those of the formula (II):

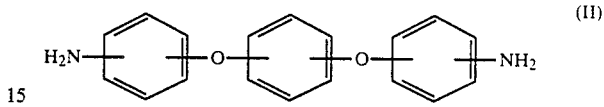

(II)

In another method of the present invention, the aromatic imide polymer comprises 30 to 90 molar % of recurring unit of the formula V:

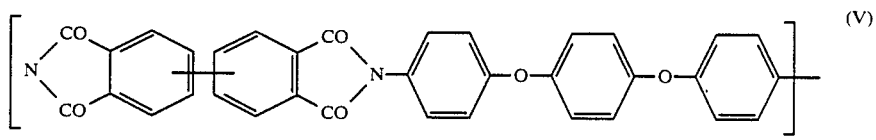

(V)

and 10–70 molar % of at least one type of recurring units selected from those of the formulae (VI), (VII) and (VIII):

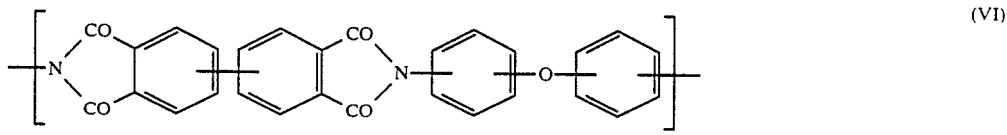

(VI)

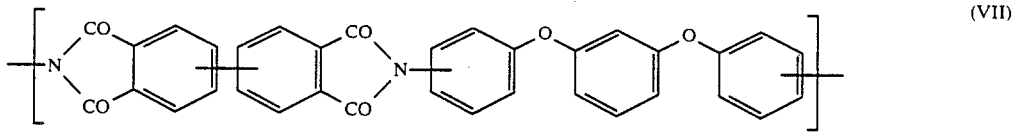

(VII)

and

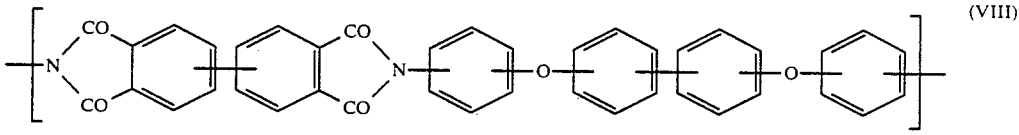

(VIII)

In still another embodiment of the method of the present invention, the aromatic imide polymer comprises 60 to 100 molar % of at least one type of principal recurring unit of the formula (IV):

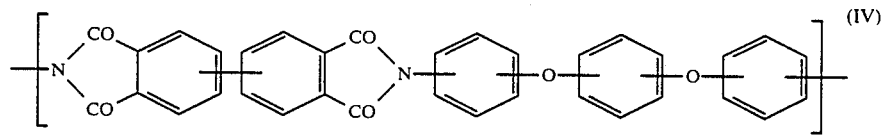

(IV)

and 0 to 40 molar % of at least one type of additional recurring units derived from the polymerization and imidization of at least one member selected from biphenyl tetracarboxylic acids, and dianhydrides, esters and salts of the acids, with at least one member selected from aromatic diamine compounds having 2 to 5 ben- This type of the aromatic imide polymer is useful for preparing an asymmetric separating membrane having a superior water-resistance and ethyl alcohol-resistance. Therefore, even after the membrane is treated with hot water, for example, at a temperature of 150° C. for 20 hours, or with a water-ethyl alcohol mixture, for example at a temperature of 150° C. for 20 hours, the treated membrane can exhibit a high retention of the water-permeating property and tensile strength thereof.

The heat-resistant, solvent soluble aromatic imide polymer usable for the present invention can be prepared by polymerizing and imidizing the specific aromatic tetracarboxylic acid component and the specific aromatic diamine components in molar amounts substantially equal to each other in an organic solvent preferably comprising at least one phenolic compound, in a manner such that the solution is heated at a relatively high temperature of about 150° C. to 250° C. or at a relatively low temperature of about 10° C. to 100° C. in the presence of an imidization agent, for example, acetic anhydride, pyridine, or a mixture thereof.

The organic solvent for the polymerization and imidization process comprises at least one member compound, for example, phenol, 2-chlorophenol, 4-chlorophenol, 4-bromophenol, cresol, N,N-dimethylacetamide and dimethylsulfoxide.

The resultant aromatic imide polymer is also soluble in the above-mentioned organic solvent.

The aromatic imide polymer is converted to an asymmetric separating membrane which may be in the form of a hollow filament or a film.

The asymmetric separating membrane usable for the present invention can be prepared by dissolving the aromatic imide polymer prepared from the specific aromatic tetracarboxylic acid component (A) and the specific aromatic diamine component (B), in a solvent comprising at least one phenolic compound to provide a dope solution; shaping the dope solution into a hollow filament-formed stream or a film-formed layer; bringing the shaped dope solution into contact with a coagulating bath to provide a solidified membrane; washing the solidified membrane with an organic solvent not capable of dissolving the solidified membrane; drying the washed membrane; and aging the dried membrane at a temperature of 150° C. to 420° C.

The organic solvent for asymmetric membrane-preparing process comprises at least one compounds selected from those usable as a solvent for the above-mentioned aromatic imide polymer-preparing process.

Preferably, in the dope solution, the aromatic imide polymer is in a concentration of 5 to 30% by weight.

The dope solution is shaped in a hollow filamentary stream thereof by extruding through a spinning nozzle for hollow filaments or in a flat filmy layer by extruding through a slit for film, or by spreading on a film-forming surface, for example, a horizontal surface of a film-forming plate or a peripheral surface of a rotating film-forming drum. The resultant shaped dope solution is brought into contact with a coagulating liquid to provide a solidified membrane. The coagulating liquid is compatible with the solvent in the dope solution but cannot dissolve therein the aromatic imide polymer in the dope solution. The coagulated aromatic imide polymer asymmetric membrane is washed with an organic solvent not capable of dissolving the solidified membrane. The washing organic solvent comprises at least one member selected from, for example, lower aliphatic alcohols having 1 to 6 carbon atoms, for example, methyl alcohol, ethyl alcohol, propyl alcohols and butyl alcohols and aliphatic and cycloaliphatic hydrocarbons having 1 to 8 carbon atoms, for example, n-hexane, n-heptane, n-octane and cyclohexane.

Then, the washed membrane is dried and aged at a temperature of 150° C. to 420° C, preferably 180° C. to 400° C., more preferably 180° to 350° C., for 1 second to 5 hours.

The method of producing a polymeric asymmetric membrane is disclosed, for example, in Japanese Unexamined Patent Publication Nos. 56-21602 and 56-157435.

The asymmetric separating membrane prepared by the above-mentioned process and usable for the method of the present inventions comprises a core porous layer preferably having a thickness of about 10 $\mu$m to 2000 $\mu$m and at least one dense layer formed at at least one side of the porous layer and preferably having a thickness of about 0.001 $\mu$m to 5 $\mu$m.

The selective water separating property of the asymmetric membrane is mainly controlled by the density and thickness of the dense layer thereof.

In the method of the present invention, the asymmetric aromatic imide polymer membrane is used for the pervaporation separation of water from an aqueous solution of an organic material. In this method, the aromatic imide polymer asymmetric membrane preferably has a water-permeation rate of 0.2 kg/m$^2$.hr or more, more preferably about 0.4 to 5.0 kg/m$^2$.hr. Also, the aromatic imide polymer asymmetric membrane preferably has a ratio [QH$_2$O]/[QC$_2$H$_5$OH] of water-permeation rate [QH$_2$O] to ethyl alcohol-permeating rate [QC$_2$H$_5$OH], of 20 or more, for example, 25 to 1000, more preferably 100 or more, still more preferably, 120 or more, particularly 130 to 1000.

In the pervaporation method of the present invention, an aqueous solution of an organic material preferably in a concentration of 50% by weight or more is brought into direct contact with one surface of the aromatic imide polymer asymmetric membrane; the opposite face of the aromatic imide polymer asymmetric membrane is exposed to an atmosphere under a reduced pressure, to cause water in the organic material aqueous solution to selectively penetrate and permeate through the asymmetric membrane; and the permeated water is collected in the state of a vapor in the reduced pressure atmosphere.

Practically, the pervaporation method of the present invention is carried out in the following steps.

(a) An organic material aqueous solution is fed to a feed side of a separating membrane module containing a number of aromatic imide polymer asymmetric membranes (in the form of a hollow filament or a flat film) so that the fed aqueous solution comes into direct contact with one face of each membrane.

(b) A delivery side opposite to the feed side of the separating membrane module is exposed to a reduced pressure by connecting the delivery side to a pressure-reducing or vacuum pump placed outside of the separating membrane module, if necessary, a sweeping(carrier) gas, for example, helium, nitrogen, and argon gases and air, is made to flow through the delivery side of the module, to promote the penetration of water.

(c) Finally, the permeated water in the state of a vapor is collected from the delivery side of the module, and if necessary condensed by cooling, and the remaining non-permeated portion of the aqueous solution is recovered from the feed side of the module.

Usually, the organic material aqueous solution is fed into the separating membrane module preferably at a temperature of from about 25° C. to 120° C., more preferably from 50° C. to 100° C.

In the method of the present invention, the pressure at the delivery side of the separating membrane module is lower than that at the feed side. Usually, the pressure at the feed side of the separating membrane module is preferably from atmospheric pressure to 60 kg/cm$^2$, more preferably from atmospheric pressure to 30 kg/cm$^2$.

Also, the pressure at the delivery side of the separating membrane module is lower than the atmospheric pressure, and is preferably about 200 Torr or less, more preferably 100 Torr or less. If necessary, a sweeping gas is made to flow through the delivery side of the module, to promote the permeation of water.

The pervaporation method of the present invention can be applied to aqueous solutions of various types of organic materials. Namely, the pervaporation method of the present invention is specifically useful for separating organic materials which cannot be separated from water by a usual distillation method, or which have boiling points very close to water, and thus are very difficult to separate from water by the usual distillation method.

The organic materials adequate to which the pervaporation method of the present invention is applied, comprise at least one member selected from, for example, aliphatic alcohols, for example, methyl alcohol, ethyl alcohol, n-propyl alcohol, isopropyl alcohol, n-butyl alcohol, sec-butyl alcohol, tert-butyl alcohol and ethylene glycol; cycloaliphatic alcohols, for example, cyclohexanol; aromatic alcohols, for example, benzyl alcohol; aliphatic carboxylic acids, for example, formic acid acetic acid, propionic acid and butyric acid; aliphatic carboxylic acid esters, for example, butyl acetate, ethyl acetate and methyl malonate; aliphatic ketones, for example, acetone, and methylethyl ketone; cyclic ethers, for example, tetrahydrofuran and dioxane; aliphatic nitriles, for example, acetonitrile and acrylnitrile; and aliphatic aldehydes, for example, formaldehyde and acetaldehyde.

In the pervaporation method of the present invention, the organic material aqueous solution is not limited to those having a specific level concentration and can be concentrated or divided into water and the organic material.

There is no restriction on the structure, type, and size of the separating membrane module to be subjected to the pervaporation method of the present invention, but preferably the separating membrane module is a plate and frame type module, spiral type module or hollow filament type module.

EXAMPLES

The present invention will be further illustrated by way of specific examples, which are merely representative and do not restrict the scope of the present invention in any way.

In the examples, the permeating rate Q and separating coefficient α were determined in the following manner.

When an organic material aqueous solution was subjected to a pervaporation method, a fraction was permeated through a separating membrane, liquefied by cooling, and then collected, and the weight of the liquefied fraction was measured. Then an internal standard liquid consisting of dehydrated n-propyl alcohol was added to the liquefied fraction, and the whole was subjected to a TCD-gas chromatography to determine the proportions in weight of water to the organic material.

The permeating rate Q of the liquefied fraction through a separating membrane and the separating coefficient α of the separating membrane for water and the organic materials were determined in accordance with the equations:

$$Q = A/B$$

$$\alpha = C_2/C_1$$

wherein A represents an amount (in kg) of a liquefied fraction permeated through the membrane per hour and B represents a permeation area (in m$^2$) of the membrane through which the liquefied fraction permeates, $C_1$ represents a proportion in weight of water to the organic materials in the aqueous solution to be fed and separated, and $C_2$ represents a proportion in weight of water permeated through the membrane to the organic materials permeated through the membrane.

In the Examples, the compounds are represented by the following abbreviations.

BAPP: 2,2-bis[4-(4-aminophenoxy)phenyl]propane
4,4'-DADE: 4,4'-diaminodiphenyl ether
3,4'-DADE: 3,4'-diaminodiphenyl ether
DM: 4,4'-diaminodiphenylmethane
TSN: o-tolidinesulfone
DABA: 3,5-diaminobenzoic acid
TPEQ: 1,4-bis(4-aminophenoxy) benzene
TPER: 1,3-bis(4-aminophenoxy) benzene
BAPB: 4,4'-bis(4-aminophenoxy) biphenyl
PASN: bis(4-aminophenyl)sulfone
BAPS: bis[4-(4-aminophenoxy)phenyl] sulfone

Referential Examples 1 to 7

(i) Preparation of an aromatic imide polymer solution

In each of Referential Examples 1 to 7, an aromatic imide polymer solution was prepared by polymerizing and imidizing the aromatic tetracarboxylic acid component having the composition as indicated in Table 1 and the aromatic diamine component having the composition as shown in Table 1, in substantially equal molar amounts, in an organic polar solvent consisting of p-chlorophenol (PCP) at a polymerization temperature of 180° C. for the polymerization time as shown in Table 1.

The resultant aromatic imide polymer solution had a polymer concentration and rotation viscosity at a temperature of 100° C., as indicated in Table 1.

(ii) Preparation of aromatic imide polymer hollow filament yarn

The aromatic imide polymer solution was subjected, as a spinning dope solution, to a hollow monofilament-spinning process by using a tule-in-orifice type spinneret and a coagulating liquid consisting of a mixture of 60 parts by weight of ethyl alcohol and 40 parts by weight of water, at a temperature of 5° C. The resultant hollow monofilament was taken up at a speed of 10 m/min, washed with ethyl alcohol and with an aliphatic hydrocarbon (n-hexane), dried at a temperature of 50° C., and aged under the temperature as indicated in Table 1 for 30 minutes.

The resultant aromatic imide polymer hollow monofilament had an outside diameter of 620 μm, an inside diameter of 370 μm, and a thickness of 125 μm.

The tensile strength and ultimate elongation of a specimen of the hollow-monofilament were measured, and the results are shown in Table 1.

Separately, another specimen of the hollow monofilament was immersed in hot water or a mixture of water and ethyl alcohol in a mixing weight ratio of 4:6 at a temperature of 150° C. for 20 hours, and the immersion treated specimen then subjected to measurements of the tensile strength and ultimate elongation thereof and the retention of the tensile strength and the ultimate elongation. The results are shown in Table 1.

hollow monofilament was taken up at a speed of 10 m/min, washed with ethyl alcohol and with an aliphatic hydrocarbon (n-hexane), dried at a temperature of 50° C., and aged under the conditions as indicated in Table 2, for 30 minutes.

TABLE 1

| Referential Example No. | Preparation of aromatic imide polymer solution | | Polyimide dope solution | | | Hollow filament yarn | | | After immersion treatment in water-ethyl alcohol mixture (4:6) at 150° C. | |
|---|---|---|---|---|---|---|---|---|---|---|
| | Composition of polymerization components | | Polymerization time (hr) | Concentration (wt. %) | Rotation viscosity (poise) | Aging temperature (°C.) | Tensile strength (kg/filament) | Ultimate elongation (%) | Retention of tensile strength (%) | Retention of elongation (%) |
| | Acid component Type & Amount (mol. %) | Diamine component Type & Amount (mol. %) | | | | | | | | |
| 1 | BPDA 100 | BAPP 85 4,4'-DADE 15 | 14 | 17 | 2000 | 250 | 0.37 | 13.8 | 106 | 105 |
| 2 | BPDA 100 | BAPP 70 4,4'DADE 30 | 12 | 17 | 1900 | 250 | 0.43 | 18.4 | 110 | 127 |
| 3 | BPDA 100 | BAPP 70 DM 30 | 10 | 17 | 2000 | 250 | 0.36 | 16.5 | 91 | 96 |
| 4 | BPDA 100 | BAPP 15 DM 85 | 12 | 17 | 2100 | 250 | 0.30 | 14.8 | 77 | 68 |
| 5(1) | BPDA 100 | BAPP 10 TSN 90 | 10 | 17 | 2500 | 250 | — | — | — | — |
| 5(2) | BPDA 100 | BAPP 10 TSN 90 | " | 17 | " | 350 | — | — | — | — |
| 6 | BPDA 100 | 4,4'-DADE 60 DM 40 | 8 | 19 | 2000 | 260 | 0.68 | 25.5 | 73 | 62 |
| 7(1) | BPDA 100 | DABA 30 4,4'-DADE 60 DM 10 | 10 | 19 | 2500 | 260 | — | — | — | — |
| 7(2) | BPDA 100 | DABA 30 4,4'-DADE 60 DM 10 | " | 19 | " | 270 | — | — | — | — |

Referential Example 8

(i) Preparation of an aromatic imide polymer solution

An aromatic imide polymer solution was prepared by polymerizing and imidizing the aromatic tetracarboxylic acid component consisting of 3,3'4,4'-biphenyl tetracarboxylic dianhydride and the aromatic diamine component 85 molar % of 1,4-bis(4-aminophenoxy benzene (TPEQ) and 15 molar % of 4,4'-diaminodiphenylether (4,4'DADE), in substantially equal molar amounts, in the organic polar solvent consisting of p-chlorophenol (PCP) at the polymerization temperature of 180° C. and for the polymerization time of 20 hours.

The resultant aromatic imide polymer solution had the polymer concentration of 17% by weight and the solution viscosity, which is a rotation viscosity (poise) at a temperature of 100° C., as shown in Table 2.

(ii) Production of aromatic imide polymer hollow monofilament

The aromatic imide polymer solution was subjected, as a spinning dope solution, to a hollow monofilament spinning process by using a tube-in-orifice type spinneret and a coagulating liquid consisting of a mixture of 60 parts by weight of ethyl alcohol with 40 parts by weight of water, at a temperature of 5° C., the resultant The resultant individual aromatic imide polymer hollow monofilament (asymmetric membrane) had the outside diameter of 432 μm, the inside diameter of 266 μm and the thickness of 83 μm.

The type of resultant hollow monofilament will be represented hereinafter by the number of the Referential Example in which the hollow monofilament was prepared.

The resultant hollow monofilament was subjected to the tests as described in Referential Example 1.

The results are shown in Table 2.

Referential Examples 9 to 22

In each of Referential Examples 9 to 22, the same procedures as those described in Referential Example 1 were carried out except that, in the preparation of the aromatic imide polymer solution, the aromatic diamine component had the composition as indicated in Table 2, and the polymerization time was as indicated in Table 2 and the resultant polymer solution had the concentration and rotation viscosity as indicated in Table 2, and in the preparation of the hollow monofilament, the dried hollow monofilament was aged at the temperature as shown in Table 2.

The results of the tests are shown in Table 2.

TABLE 2

| Referential Example No. | Preparation of aromatic polyimide solution | | Polyimide dope solution | | | Hollow filament yarn | | | After immersion treatment in water-ethyl alcohol mixture (4:6) at 150° C. | |
|---|---|---|---|---|---|---|---|---|---|---|
| | Composition of polymerization components | | Polymerization time (hr) | Concentration (wt. %) | Rotation viscosity (poise) | Aging temperature (°C.) | Tensile strength (kg/filament) | Ultimate elongation (%) | Retention of tensile strength (%) | Retention of elongation (%) |
| | Acid component Type & Amount (mol. %) | Diamine component Type & Amount (mol. %) | | | | | | | | |
| 8 | BPDA 100 | TPEQ 85, 4,4'-DADE 15 | 20 | 17 | 2000 | 250 | 0.22 | 13.4 | 80 | 82 |
| 9-(1) | BPDA 100 | TPEQ 50, 4,4'-DADE 50 | 18 | 17 | 2000 | 260 | 0.40 | 25.6 | 93 | 100 |
| 9-(2) | BPDA 100 | TPEQ 50, 4,4'-DADE 50 | " | " | " | 250 | — | — | — | — |
| 10-(1) | BPDA 100 | TPEQ 40, 4,4'-DADE 60 | 16 | 17 | 2000 | 260 | — | — | — | — |
| 10-(2) | BPDA 100 | TPEQ 40, 4,4'-DADE 60 | " | " | " | 250 | 0.32 | 22.3 | 81 | 82 |
| 11 | BPDA 100 | TPEQ 50, 3,4'-DADE 50 | 25 | 17 | 1800 | 250 | 0.38 | 27.3 | 93 | 89 |

TABLE 2-continued

| Referential Example No. | Preparation of aromatic polyimide solution Composition of polymerization components | | Polyimide dope solution | | | Hollow filament yarn | | | After immersion treatment in water-ethyl alcohol mixture (4:6) at 150° C. | |
|---|---|---|---|---|---|---|---|---|---|---|
| | Acid component Type & Amount (mol. %) | Diamine component Type & Amount (mol. %) | Polymerization time (hr) | Concentration (wt. %) | Rotation viscosity (poise) | Aging temperature (°C.) | Tensile strength (kg/filament) | Ultimate elongation (%) | Retention of tensile strength (%) | Retention of elongation (%) |
| 12(1) | BPDA 100 | TPEQ 85, TPER 15 | 12 | 17 | 2000 | 250 | — | — | — | — |
| 12(2) | BPDA 100 | TPEQ 85, TPER 15 | " | " | " | 240 | — | — | — | — |
| 13 | BPDA 100 | TPEQ 70, TPER 30 | 22 | 17 | 1800 | 250 | 0.32 | 23.2 | 86 | 71 |
| 14 | BPDA 100 | TPEQ 50, DM 50 | 16 | 17 | 2000 | 250 | 0.59 | 52.3 | 71 | 60 |
| 15 | BPDA 100 | TPEQ 80, 4,4'-DADE 10 BAPB 10 | 10 | 17 | 2000 | 250 | 0.36 | 20.3 | 84 | 85 |
| 16 | BPDA 100 | TPEQ 70, BAPB 30 | 17 | 17 | 2000 | 250 | 0.29 | 16.4 | 79 | 92 |
| 17 | BPDA 100 | TPEQ 70, BAPP 30 | 16 | 17 | 2000 | 250 | 0.39 | 14.5 | 87 | 99 |
| 18 | BPDA 100 | TPEQ 10, 4,4'-DADE 90 | 19 | 17 | 2100 | 250 | 0.44 | 49.9 | 78 | 59 |
| 19(1) | BPDA 100 | TPEQ 10, TSN 90 | 10 | 17 | 2500 | 250 | — | — | — | — |
| 19(2) | BPDA 100 | TPEQ 10, TSN 90 | " | " | " | 350 | — | — | — | — |
| 20 | BPDA 100 | TPEQ 20, PASN 80 | 20 | 23 | 2500 | 260 | — | — | — | — |
| 21 | BPDA 100 | TPEQ 20, BAPS 80 | 20 | 23 | 2500 | 250 | — | — | — | — |
| 22(1) | BPDA 100 | DABA 30, 4,4'-DADE 60, DM 10 | 10 | 19 | 2500 | 260 | — | — | — | — |
| 22(2) | BPDA 100 | TPEQ 30, 4,4'-DADE 60, DM 10 | " | " | " | 270 | — | — | — | — |

Examples 1 to 3 and Comparative Examples 1 to 6

In each of Examples 1 to 3 and Comparative Examples 1 to 6, 4 of the aged hollow monofilaments of the type shown in Table 3 were arranged in parallel to each other to form a hollow monofilament bundle. The bundle was folded to form a loop, and the open ends of the individual hollow monofilaments were sealed with an epoxy resin to provide a hollow monofilament bundle element.

The hollow monofilament bundle element was placed in a container having an inlet for feeding an organic material aqueous solution, an outlet for recovering a nonpermeated fraction, and an outlet for collecting a permeated fraction, to provide a separating membrane module. An aqueous solution of 80% by weight of ethyl alcohol was fed into the separating membrane module at a temperature of 90° C. so that the solution comes into contact with the outside peripheral surfaces of the hollow filaments. The hollow spaces of the individual hollow monofilaments were connected to a pressure-reducing or vacuum apparatus, and the pressure in the hollow spaces was reduced to 3 Torr or less, to cause a specific fraction of the solution to be selectively permeated through the hollow filaments. The permeated fraction in the state of a vapor was cooled, and the resultant liquefied fraction was collected.

The permeating rate Q of the permeated fraction through the hollow monofilaments and the separating coefficient α of the hollow monofilaments are shown in Table 3.

In each of Example 2 and Comparative Examples 1 and 4, the hollow monofilaments were further treated with hot water or a water-ethyl alcohol mixture (4:6) at a temperature of 150° C. for 20 hours, dried at 60° C. under a reduced pressure, and the resultant treated hollow monofilaments were subjected to the same separating property tests as mentioned above.

The separating properties of the treated hollow monofilaments are also shown in Table 3.

TABLE 3

| | | | Separating properties of hollow filament for 80% ethyl alcohol aqueous solution | | | | | | |
|---|---|---|---|---|---|---|---|---|---|
| | | | Before treatment | | | After treatment with hot water | | After treatment with hot EtOH aqueous solution | |
| Example No. | Type of hollow filament(*)1 | Temperature (°C.) | Permeating rate Q (kg/m²·hr) | Separating coefficient α $\left(\dfrac{QH_2O}{QEtOH}\right)$ | | Permeating rate Q (kg/m²·hr) | Separating coefficient α $\left(\dfrac{QH_2O}{QEtOH}\right)$ | Permeating rate Q (kg/m²·hr) | Separating coefficient α $\left(\dfrac{QH_2O}{QEtOH}\right)$ |
| Example | | | | | | | | | |
| 1 | 1 | 90 | 0.75 | 32 | | — | — | — | — |
| 2 | 2 | 90 | 0.80 | 41 | | 0.80 | 41 | 0.80 | 37 |
| 3 | 3 | 90 | 0.80 | 30 | | — | — | — | — |
| Comparative Example | | | | | | | | | |
| 1 | 4 | 90 | 0.82 | 37 | | 0.83 | 37 | 0.92 | 18 |
| 2 | 5-(1) | 90 | 10.50 | 1.7 | | — | — | — | — |
| 3 | 5-(2) | 90 | 2.50 | 2.1 | | — | — | — | — |
| 4 | 6 | 90 | 1.00 | 170 | | 1.00 | 170 | 1.17 | 18 |
| 5 | 7-(1) | 90 | 7.58 | 1.3 | | — | — | — | — |

TABLE 3-continued

| | | | Item | | | | | |
|---|---|---|---|---|---|---|---|---|
| | | | Separating properties of hollow filament for 80% ethyl alcohol aqueous solution | | | | | |
| | | | Before treatment | | After treatment with hot water | | After treatment with hot EtOH aqueous solution | |
| Example No. | Type of hollow filament(*)1 | Temperature (°C.) | Permeating rate Q (kg/m²·hr) | Separating coefficient α $\left(\frac{QH_2O}{QEtOH}\right)$ | Permeating rate Q (kg/m²·hr) | Separating coefficient α $\left(\frac{QH_2O}{QEtOH}\right)$ | Permeating rate Q (kg/m²·hr) | Separating coefficient α $\left(\frac{QH_2O}{QEtOH}\right)$ |
| 6 | 7-(2) | 90 | 2.43 | 4.3 | — | — | — | — |

Note:
(*)1 The type of the hollow filaments are represented by the numbers of Referential Examples in which the hollow filaments were prepared.

Examples 4 to 10 and Comparative Examples 7 to 13

In each of Examples 4 to 7 and Comparative Examples 7 to 13, the same procedures as mentioned in Example 1 were carried out, except that the hollow monofilament bundle element was prepared from the individual hollow monofilaments prepared in the Referential Example indicated in Table 4.

The results of the separating test are shown in Table 4.

The hollow monofilaments were treated in hot water at a temperature of 150° C. for 20 hours, withdrawn from the treating hot water, and then dried at room temperature under a reduced pressure. The dried monofilaments were dissolved in a solvent consisting of a mixture of 4 parts by weight of p-chlorophenol (PCP) with 1 part by weight of o-chlorophenol (OCP). The logarithmic viscosity $V_1$ of the solution of the treated hollow monofilaments was measured at a temperature of 30° C.

Separately, the logarithmic viscosity $V_0$ of a solution of the non-treated hollow monofilaments were determined in the same manner as mentioned above.

The retention of the logarithmic viscosity of the hollow monofilaments was calculated in accordance with the following equation:

$$\text{Retention (\%)} = \frac{V_1}{V_0} \times 100$$

The results are shown in Table 4.

Further, in each of Examples 10, 15 and 16 and Comparative Example 7, the hollow monofilaments were further treated with water or a water-ethyl alcohol mixture (4:6) at a temperature of 150° C. for 20 hours. The treated hollow monofilaments were dried at a temperature of 60° C. under a reduced pressure.

The separating properties of the treated hollow monofilaments are shown in Table 4.

TABLE

| | | | Item | | | | | | | |
|---|---|---|---|---|---|---|---|---|---|---|
| | | | Separating properties of hollow filament for 80% ethyl alcohol aqueous solution | | | | | | | |
| | | | Before treatment | | | After treatment with water at 150° C. | | After treatment with 60% EtOH aqueous solution at 150° C. | | |
| Example No. | Type of hollow filament | Temperature (°C.) | Permeating rate Q (kg/m²·hr) | Separating coefficient α $\left(\frac{QH_2O}{QEtOH}\right)$ | Retention of viscosity (%) | Permeating rate Q (kg/m²·hr) | Separating coefficient α $\left(\frac{QH_2O}{QEtOH}\right)$ | Permeating rate Q (kg/m²·hr) | Separating coefficient α $\left(\frac{QH_2O}{QEtOH}\right)$ |
| Example | | | | | | | | | |
| 4 | 8 | 90 | 1.44 | 132 | 95 | — | — | — | — |
| 5 | 9-(1) | " | 0.54 | 531 | — | — | — | — | — |
| 6 | 9-(2) | " | 2.39 | 233 | 94 | — | — | — | — |
| 7 | 10-(1) | " | 1.26 | 317 | — | — | — | — | — |
| 8 | 10-(2) | " | 1.47 | 156 | 93 | — | — | — | — |
| 9 | 11 | " | 1.32 | 133 | 94 | — | — | — | — |
| 10 | 12-(1) | " | 0.98 | 325 | 95 | 1.02 | 314 | 0.99 | 295 |
| 11 | 12-(2) | " | 1.47 | 175 | — | — | — | — | — |
| 12 | 13 | " | 1.42 | 157 | 95 | — | — | — | — |
| 13 | 14 | " | 1.35 | 128 | 89 | — | — | — | — |
| 14 | 15 | " | 1.31 | 145 | 94 | — | — | — | — |
| 15 | 16 | 90 | 1.25 | 210 | 93 | 1.25 | 205 | 1.30 | 200 |
| 16 | 17 | " | 1.20 | 124 | 94 | 1.22 | 120 | 0.92 | 125 |
| Comparative Example | | | | | | | | | |
| 7 | 18 | " | 0.95 | 135 | 85 | 0.96 | 133 | 1.02 | 67 |
| 8 | 19-(1) | " | 12.07 | 1.2 | 30 | — | — | — | — |
| 9 | 19-(2) | " | 2.03 | 3.9 | — | — | — | — | — |
| 10 | 20 | " | 1.11 | 17.8 | 55 | — | — | — | — |
| 11 | 21 | " | 1.28 | 11.0 | 75 | — | — | — | — |
| 12 | 22-(1) | " | 7.58 | 1.3 | — | — | — | — | — |
| 13 | 22-(2) | " | 2.43 | 4.3 | — | — | — | — | — |

As the examples clearly indicate, the pervaporation separating method of the present invention, in which a specific aromatic imide polymer asymmetric membrane is used as a separating membrane, effectively and selectively separates water from an organic material aqueous solution at a high permeating rate and at a high separating efficiency over a long time.

The specific aromatic imide polymer asymmetric membrane has a superior resistance to heat, hot water and solvent, and thus exhibits a high durability in a separating process at a relatively high temperature, over a long time.

We claim:

1. A pervaporation method of selectively separating water from an aqueous solution of an organic material, comprising the steps of:
   bringing an aqueous solution of an organic material into contact with one face of an asymmetric membrane comprising at least one type of heat-resistant, solvent soluble aromatic imide polymer which consists essentially of a polymerization and imidization product of:
   (A) an aromatic tetracarboxylic acid component comprising:
      (a) 60 to 100 molar % of at least one principal member selected from the group consisting of biphenyl tetracarboxylic acids and dianhydrides, esters and salts of the above-mentioned acids, and
      (b) 0 to 40 molar % of at least one additional member selected from the group consisting of aromatic tetracarboxylic acids and dianhydrides, esters and salts of the acids which are different from the above-mentioned compounds for the principal member (a); with
   (B) an aromatic diamine component comprising:
      (c) 60 to 100 molar % of at least one principal member selected from the aromatic diamine compounds of the formulae (I) and (II):

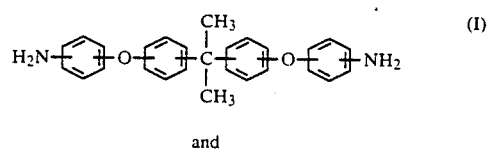

and

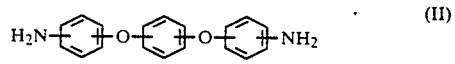

and
      (d) 0 to 40 molar % of at least one additional member selected from another aromatic diamine compounds having 2 to 5 benzene ring structures and different from the compounds of the formulae (I) and (II);
   exposing the opposite face of the aromatic imide polymer asymmetric membrane to an atmosphere under a reduced pressure, to cause water in the aqueous solution to selectively permeate through the asymmetric membrane and the permeated water to be vaporized in the reduced pressure atmosphere; and
   collecting the permeated and vaporized water.

2. The method as claimed in claim 1, wherein the principle member (a) of the aromatic tetracarboxylic acid component (A) is in an amount of 80 to 100 molar %.

3. The method as claimed in claim 1, wherein the principal acid member (a) in the aromatic tetracarboxylic acid component (A) is selected from the group consisting of 2,3,3',4'-biphenyltetracarboxylic acid, 3,3'4,4'-biphenyltetracarboxylic acid, and dianhydrides, lower alkyl esters and salts of the above-mentioned acids.

4. The method as claimed in claim 1, wherein the additional acid member (b) in the aromatic tetracarboxylic acid component (A) is selected from the group consisting of pyromellitic acid, 3,3',4,4'-diphenylether tetracarboxylic acid, 2,2-bis(3,4-dicarboxyphenyl)propane, bis(3,4-dicarboxyphenyl)methane, 3,3',4,4'-benzophenone tetracarboxylic acid, and dianhydrides, lower alkyl esters and salts of the above-mentioned acids.

5. The method as claimed in claim 1, wherein the principal aromatic diamine compound (c) of the formula (I) in the aromatic diamine component (B) is selected from the group consisting of 2,2-bis[4-(4-aminophenoxy)phenyl]propane, 2,2-bis[4-(3-aminophenoxy)phenyl]propane, 2,2-bis[3-(4-aminophenoxy)phenyl]propane, and 2,2-bis[3-(3-aminophenoxy)phenyl]propane.

6. The method as claimed in claim 1, wherein the principal aromatic diamine compound (c) of the formula (II) in the aromatic diamine component (B) is selected from the group consisting of 1,4-bis(4-aminophenoxy)benzene, 1,4-bis(3-aminophenoxy)benzene, 1,3-bis(4-aminophenoxy)benzene and 1,3-bis(3-aminophenoxy)benzene.

7. The method as claimed in claim 1, wherein the additional aromatic diamine compound (d) in the aromatic diamine component (B) is selected from the group consisting of diaminodiphenyl ethers, diaminodiphenyl methanes, diaminodiphenyl propanes, diaminobiphenyls, diaminodiphenyl thioethers, diaminodiphenyl sulfones, diaminodiphenylene sulfones, diaminodibenzothiophenes, diaminothioxanthenes, bis(aminophenoxy)benzenes, bis[(aminophenoxy)phenyl]ethers, bis(aminophenoxy)biphenyls, bis[(aminophenoxy)phenyl]ethers, and di[(aminophenoxy)phenyl]methanes.

8. The method as claimed in claim 1, wherein the aromatic imide polymer asymmetric membrane is in the form of a hollow filament.

9. The method as claimed in claim 1, wherein the aromatic imide polymer asymmetric membrane is in the form of a film.

10. The method as claimed in claim 1, wherein the aromatic imide polymer asymmetric membrane is prepared by dissolving the polymerization product of the aromatic tetracarboxylic acid component (A) with the aromatic diamine component (B) in a solvent comprising at least one phenolic compound to provide a dope solution; shaping the dope solution into a hollow filament-formed stream or a film-formed layer; bringing the shaped dope solution into contact with a coagulating bath to provide a solidified membrane; washing the solidified membrane with an organic solvent not capable of dissolving the solidified membrane; drying the washed membrane; and aging the dried membrane at a temperature of 150° C. to 420° C.

11. The method as claimed in claim 1, wherein the aromatic imide polymer asymmetric membrane has a water-permeation rate of 0.2 kg/m$^2$.hr or more.

12. The method as claimed in claim 1, wherein the aromatic imide polymer asymmetric membrane has a ratio of water-permeation rate to ethyl alcohol-permeation rate of 20 or more.

13. The method as claimed in claim 1, wherein the aromatic imide polymer asymmetric membrane is composed essentially of a dense layer having a thickness of 0.001 to 5 μm and a porous layer formed on the dense layer and having a thickness of 10 to 2000 μm.

14. The method as claimed in claim 1, wherein the aqueous solution of organic material has a temperature of from 25° C. to 120° C.

15. The method as claimed in claim 1, wherein the contact of the aqueous solution of organic material with the asymmetric membrane face is carried out under a pressure of from the atmospheric pressure to 60 kg/cm²G.

16. The method as claimed in claim 1, wherein the atmosphere to which the opposite face of the asymmetric membrane is exposed, has a reduced pressure of 200 Torr or less.

17. The method as claimed in claim 1, wherein the organic material in the aqueous solution comprises at least one member selected from the group consisting of aliphatic alcohols, cycloaliphatic alcohols, aromatic alcohols, aliphatic carboxylic acids, cycloaliphatic carboxylic acids, aromatic carboxylic acids, and aliphatic carboxylic acid esters, ketones, cyclic ethers, nitriles and aldehydes.

18. The method as claimed in claim 1, wherein the aromatic imide polymer in the asymmetric membrane comprises:
   (1) 60 to 100 molar % of at least one type of major recurring units selected from those of the formulae (III) and (IV):
   (2) 0 to 40 molar % of at least one type of minor recurring units selected from those derived from polymerization of:
      (i) an aromatic tetracarboxylic acid component consisting essentially of at least one member selected from the group consisting of biphenyl tetracarboxylic acids and dianhydrides, esters and salts thereof, with
      (ii) an aromatic diamine component consisting essentially of at least one member selected from aromatic diamine compounds having 2 to 5 benzene ring structure and different from those of the formulae (I) and (II):

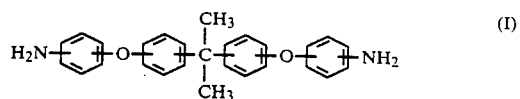

and

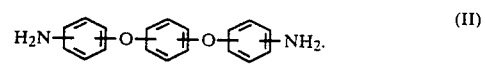

19. A prevaporation method of selectively separating water from an aqueous solution of an organic material, comprising the steps of:
   bringing an aqueous solution of an organic material into contact with one face of an asymmetric membrane comprising at least one type of heat-resistant, solvent soluble aromatic imide polymer comprising:
   30 to 90 molar % of recurring unit of the formula (V):

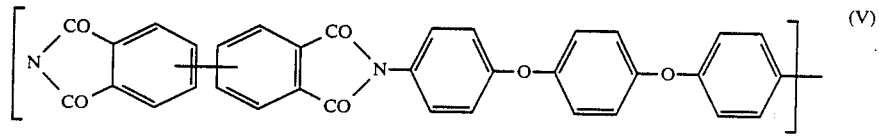

and 10–70 molar % of at least one type of recurring units selected from those of the formulae (VI), (VII) and (VIII):

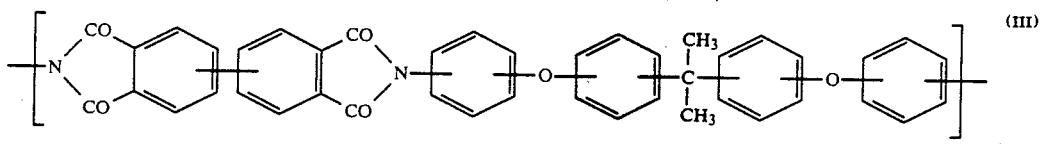

and

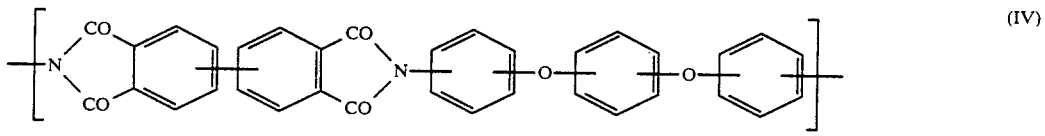

and

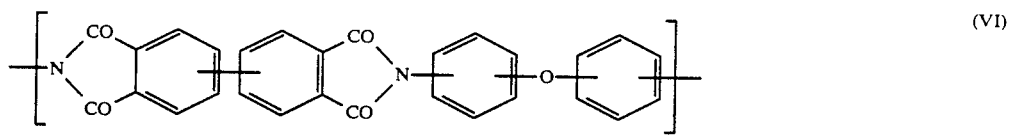

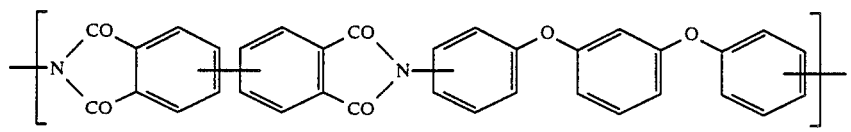
(VII)
and
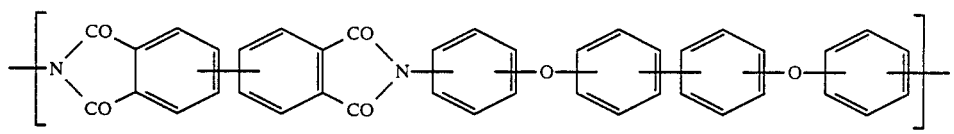
(VIII)
exposing the opposite face of the aromatic imide polymer asymmetric membrane to an atmosphere under a reduced pressure, to cause water in the aqueous solution to selectively permeate through the asymmetric membrane and the permeated water to be vaporized in the reduced pressure atmosphere; and
collecting the permeated and vaporized water.
* * * * *